United States Patent
Ruan et al.

(10) Patent No.: US 7,840,605 B2
(45) Date of Patent: *Nov. 23, 2010

(54) SYSTEM AND METHOD FOR GENERATING RUNTIME METADATA FOR USE IN THE DEVELOPMENT OF MOBILE DEVICE APPLICATIONS

(75) Inventors: Zhigang Ruan, Waterloo (CA); Anish Agrawal, Kanata (CA); Damon Kropf-Untucht, Stratford (CA)

(73) Assignee: Research In Motion Limited, Waterloo, Ontario (CA)

( * ) Notice: Subject to any disclaimer, the term of this patent is extended or adjusted under 35 U.S.C. 154(b) by 8 days.

This patent is subject to a terminal disclaimer.

(21) Appl. No.: 12/393,479

(22) Filed: Feb. 26, 2009

(65) Prior Publication Data
US 2009/0164972 A1    Jun. 25, 2009

Related U.S. Application Data

(63) Continuation of application No. 11/446,229, filed on Jun. 5, 2006, now Pat. No. 7,516,141.

(51) Int. Cl.
G06F 17/30 (2006.01)
(52) U.S. Cl. .................. 707/802; 707/756; 717/100; 717/153
(58) Field of Classification Search .......... 707/802, 707/756, 999.1; 717/100, 153
See application file for complete search history.

(56) References Cited

U.S. PATENT DOCUMENTS

| | | | |
|---|---|---|---|
| 5,878,411 A * | 3/1999 | Burroughs et al. ......... 717/106 |
| 6,061,515 A | 5/2000 | Chang et al. | |
| 6,615,204 B1 | 9/2003 | Menon | |
| 7,516,141 B2 * | 4/2009 | Ruan et al. ................... | 1/1 |
| 7,603,378 B2 * | 10/2009 | Ivanova ....................... | 1/1 |
| 2003/0233373 A1 | 12/2003 | Hembry et al. | |
| 2004/0015515 A1 | 1/2004 | Beisiegel et al. | |
| 2004/0224674 A1 * | 11/2004 | O'Farrell et al. ............ | 455/418 |
| 2004/0250238 A1 | 12/2004 | Singh et al. | |
| 2006/0143223 A1 | 6/2006 | Ivanova | |

OTHER PUBLICATIONS

European Search Report. Application No. 06114960.5 Dated: Nov. 24, 2006.
European Examination Report. Application No. 06114960.5 Dated: Oct. 10, 2008.
European Examination Report. Application No. 06114960.5. Dated: Aug. 9, 2010.

\* cited by examiner

*Primary Examiner*—Cheryl Lewis
(74) *Attorney, Agent, or Firm*—Bereskin & Parr LLP/S.E.N.C.R.L., s.r.l.

(57) ABSTRACT

A system and method for generating runtime metadata for use in the development of mobile device applications. A metadata file, such as an XML file that is used to capture the metadata for a database associated with a mobile device application, is used to generate initialization code. This initialization code, when executed, creates runtime metadata for the application database in terms of a first object (e.g. classID object) through which metadata associated with the application database is accessible and at least one second object (e.g. propertyID object) through which metadata associated with a property of a data record of the application database is accessible.

17 Claims, 8 Drawing Sheets

DATABASE TABLE, SHOWING RECORD ID (CEOID), AND PROPERTY ID AND TYPE (ID#(TYPE)) READ FROM A PROPID

US 7,840,605 B2

SYSTEM AND METHOD FOR GENERATING RUNTIME METADATA FOR USE IN THE DEVELOPMENT OF MOBILE DEVICE APPLICATIONS

CROSS REFERENCE TO RELATED APPLICATION

This application is a continuation of prior U.S. patent application Ser. No. 11/446,229, U.S. Pat. No. 7,516,414 filed on Jun. 5, 2006, the entirety of which is hereby incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Embodiments of the system and method described herein relate generally to the development of mobile device applications, and more specifically to a framework for generating runtime metadata for databases associated with such applications.

BACKGROUND

Typically, mobile devices operate within a service infrastructure that requires synchronization of application data between a mobile device and a server. The types of applications that may be developed for use on mobile devices span a wide range, and can include, for example, electronic mail (e-mail) applications, calendar applications, task applications, contact applications, memo applications, and others. This list continues to grow as an increasing number of applications are being developed specifically for use with mobile devices.

It may be observed that these applications have certain common requirements and features. For instance, there is typically a database (e.g. a table) that is maintained on the server side, and a corresponding database that is maintained on the device side. Generally, a mobile device application is required to synchronize the data in these databases, and display data correctly on the mobile device.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Figure 1:
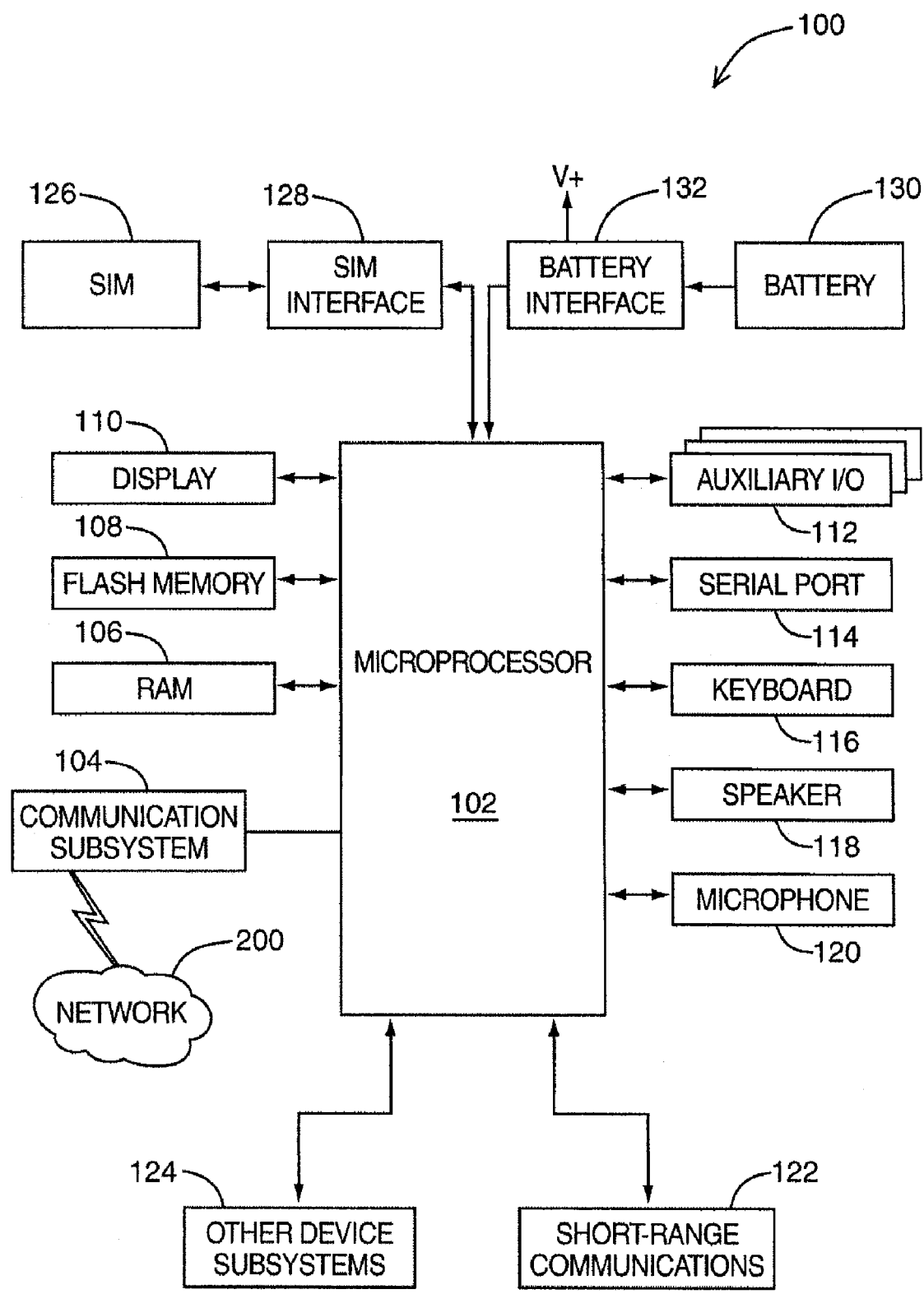
FIG. 1 is a block diagram of a mobile device in one example implementation.

From the perspective of a developer of mobile device applications, developing a new application, for example, may be considered tedious and time-consuming if a large amount of code needs to be written to support the new application. Accordingly, embodiments of the system and method described herein relate generally to a framework that recognizes the common features of mobile device applications, and provides tools that allow developers to write relatively small amounts of application-specific code to support new applications. In this way, the maintainability, readability, and scalability of developed programs may be improved.

In one broad aspect, there is provided a method of generating runtime metadata for use in the development of mobile device applications, the method comprising the steps of: parsing a metadata file associated with an application database; generating initialization code for instantiating a class that represents the application database; and generating initialization code for instantiating a class that represents a property of a data record of the application database; wherein, in use, the initialization code for instantiating a class that represents the application database and the initialization code for instantiating a class that represents a property of a data record of the application database are executed such that runtime metadata is created; the runtime metadata comprising a first object through which metadata associated with the application database is accessible, and at least one second object through which metadata associated with a property of a data record of the application database is accessible.

In another broad aspect, there is provided a system for generating runtime metadata for use in the development of mobile device applications, the system comprising a runtime metadata generator, wherein the runtime metadata generator is programmed to: parse a metadata file associated with an application database; generate initialization code for instantiating a class that represents the application database; and generate initialization code for instantiating a class that represents a property of a data record of the application database associated with the metadata file; wherein, in use, the initialization code for instantiating a class that represents the application database and the initialization code for instantiating a class that represents a property of a data record of the application database are executed such that runtime metadata is created; the runtime metadata comprising a first object through which metadata associated with the application database is accessible, and at least one second object through which metadata associated with a property of a data record of the application database is accessible.

Features of these and other aspects, and of a number of embodiments of the systems and methods are described below.

The description of some embodiments of the systems and methods described herein make reference to a mobile device, also known in the art as a mobile station. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
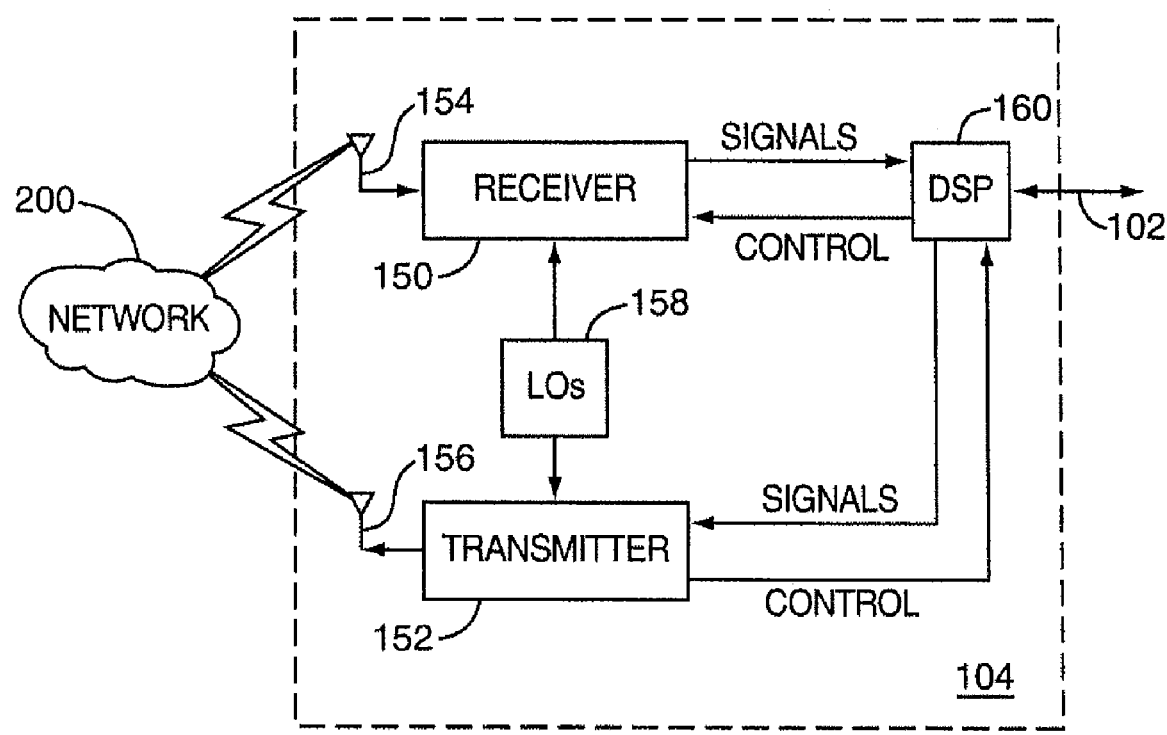
FIG. 2 is a block diagram of a communication subsystem component of the mobile device of FIG. 1.
Figure 3:
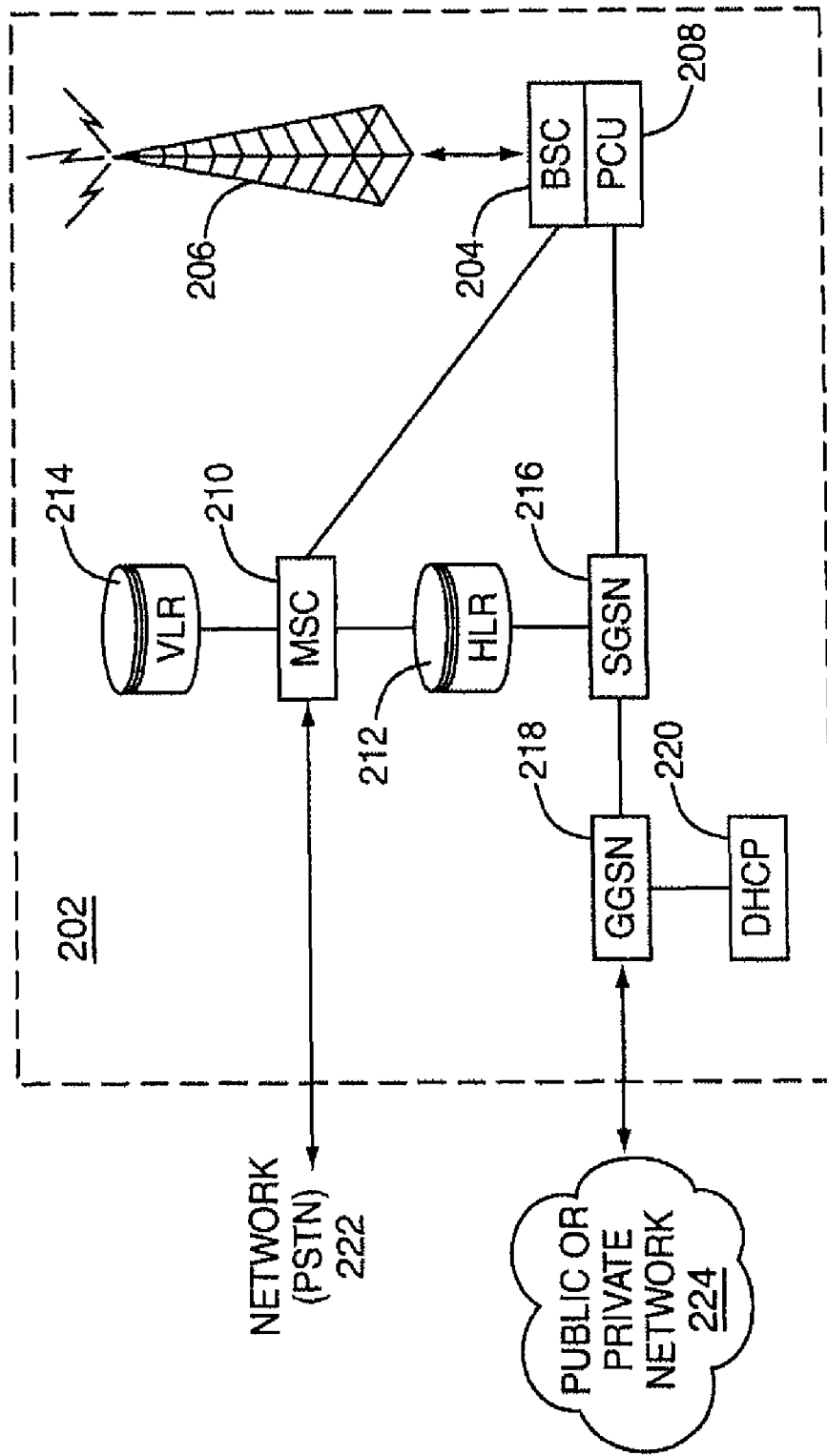
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDEN™), Evolution-Data Optimized (EV-DO), and High Speed Downlink Packet Access (HSDPA).

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, task items, contact items and note items. A PIM application has the ability to send and receive data items via wireless network 200. PIM data items may be seamlessly integrated, synchronized, and updated via wireless network 200 with the mobile device subscriber's corresponding data items stored and/or associated with a host computer system.

This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

As previously noted, embodiments of the system and method described herein relate generally to a framework that recognizes the common features of mobile device applications, and provides tools that, for example, allow application developers to write relatively small amounts of application-specific code to support new applications.

For example, the framework allows application developers to apply the general idea of programming against metadata associated with application databases to certain specific problems that may be encountered in the development of mobile device applications that require data synchronization. In particular, the framework permits at least one of the following features to be provided:

generation of database schema;

creation of database records that provide general "get" and "set" functions, application-specific "get" and "set" functions, and other application-specific methods;

provision of a mechanism to map different identifiers (e.g. for a database, or a certain property of database records) used in different layers (e.g. transport access, database, application) of an application;

provision of a mechanism to convert data from one format as used in one layer of an application to another format used in another layer, without requiring explicit identification of the database and/or property name;

provision of general user interface controls to display or manipulate database records; and provision of a mechanism that allows a variety of properties to be associated with database records (e.g. an indication of whether a particular database or property is transient).

Figure 4A:
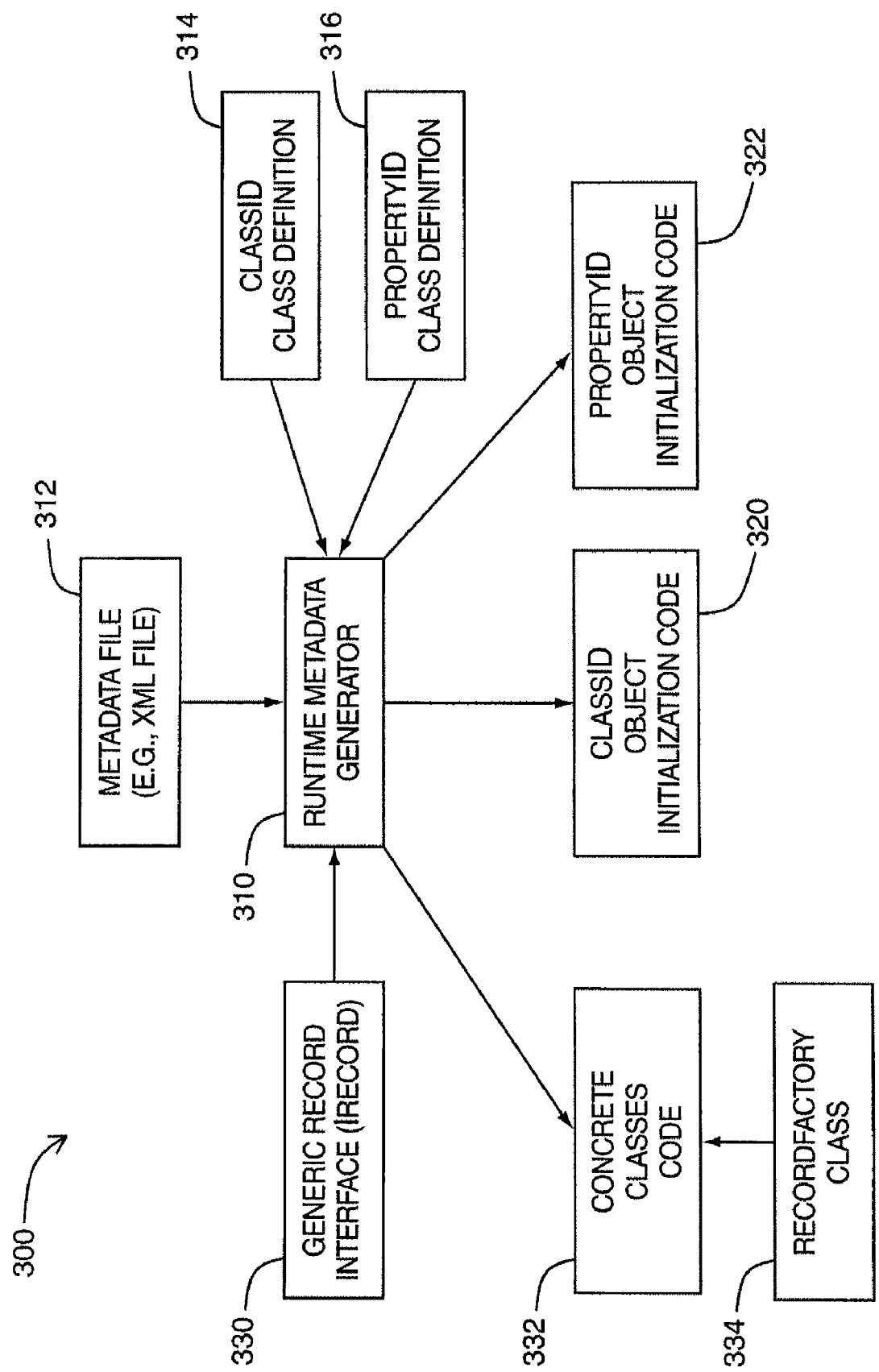
FIG. 4A is a schematic diagram illustrating components of a system for generating runtime metadata for use in the development of mobile device applications in a number of example embodiments.
Figure 4B:
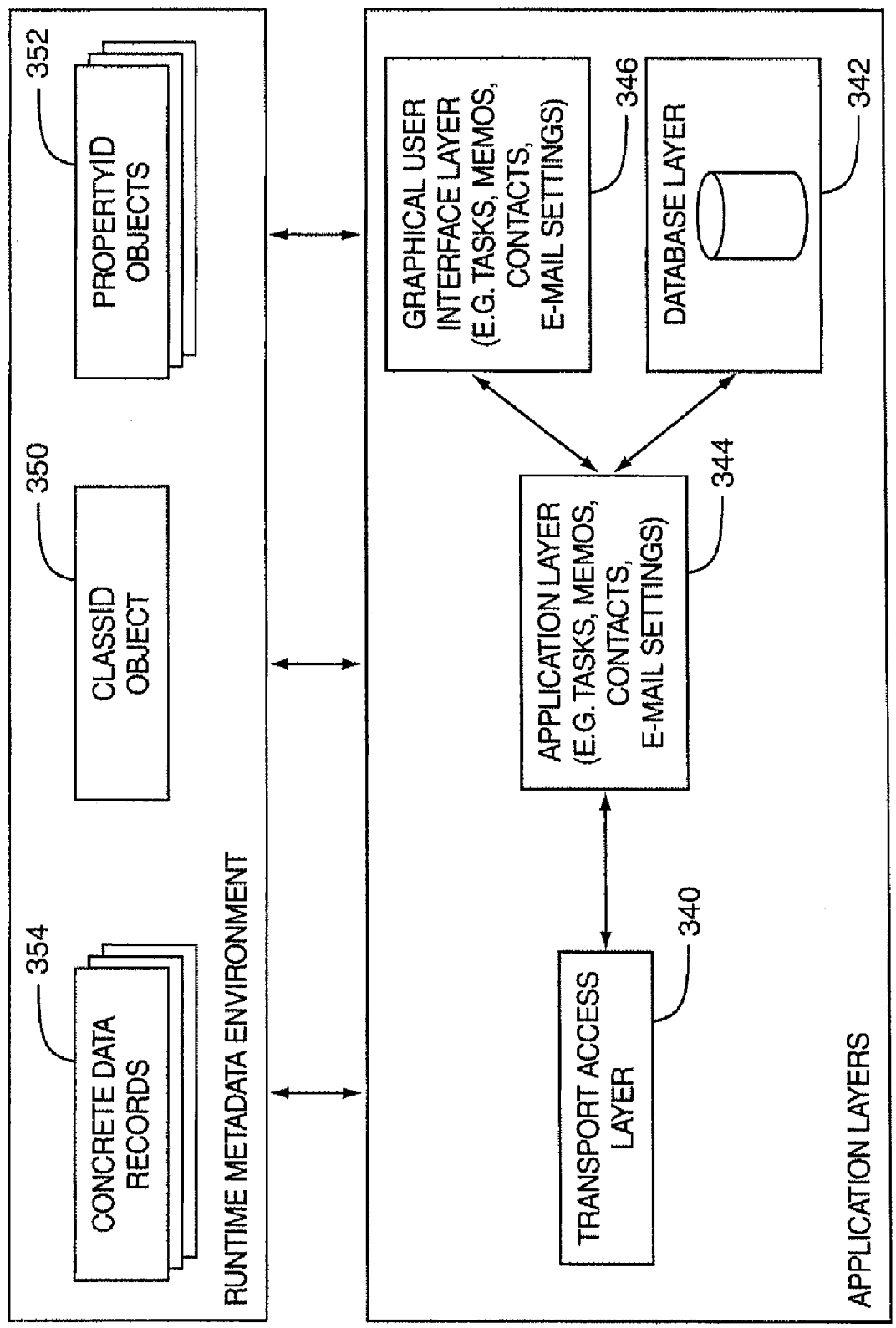
FIG. 4B is a schematic diagram illustrating layers of a mobile device application, which can be programmed to use the runtime metadata.

Referring now to FIG. 4A, a schematic diagram of components of a system for generating runtime metadata for use in the development of mobile device applications is shown generally as 300, in at least one embodiment. Reference is also made to FIG. 4B, in which a schematic diagram illustrating layers of a mobile device application, which can be programmed to use the runtime metadata in at least one embodiment, is shown.

In one embodiment, system 300 comprises a runtime metadata generator 310 that is programmed to take, as input, a file that has been used to capture the metadata associated with a database for a specific application (e.g. database of tasks, database of contacts, database of memos), and generate runtime metadata in terms of a classID object 350 and propertyID objects 352.

In one embodiment, the file that is used to capture the metadata associated with a particular application database is in the form of an Extensible Markup Language (XML) file 312. The XML file 312 provides, in XML format, general information about an application database (e.g. what properties the data records have, the data types of these properties, etc.).

Runtime metadata is metadata that is based on the XML file 312, represented in another format (in this embodiment, in terms of a classID object 350 and propertyID objects 352), and which is initialized at the mobile device (e.g. in RAM 106 of FIG. 1) when the application starts as a result of the execution of initialization code (e.g. initialization code 320, 322 as described below).

The process of generating the initialization code to create the runtime metadata as performed by the runtime metadata generator 310 will be described in further detail below, in respect of a number of embodiments.

A classID object 350 is an instance of a pre-defined class 314 that represents the particular application database. Class 314 defines data specifically associated with the application database (e.g. an identifier internal to the classID object 350 that identifies the application database, as well as other identifiers used in different application layers that identify the same application database), and methods to access and manipulate data associated with the application database (e.g. retrieve information on properties associated with records of the application database, provide a mapping between identifiers used in different application layers that identify the same application database). It will be understood by persons skilled in the art that the classID object 350 and class 314 has been named "classID" in this specification for ease of understanding only, and different names may be used to describe the object and class in variant implementations.

Every property of a record of the particular application database will be identified using a unique identifier. Although this identifier may easily be represented as an integer value, in one embodiment, the property is instead identified using a propertyID object 352, which is an instance of a pre-defined class 316 that represents a particular property of data records of the particular application database. Class 316 defines data associated with the particular property (e.g. an identifier internal to the propertyID object 352 that identifies the property, as well as other identifiers used in different application layers that identify the same property), and methods to access and manipulate data associated with the application database (e.g. provide a mapping between identifiers used in different application layers that identify the property), as will be explained in further detail below with reference to FIG. 5. It will be understood by persons skilled in the art that a propertyID object 352 and class 316 has been named "propertyID" in this specification for ease of understanding only, and different names may be used to describe the object and class in variant implementations.

A classID object 350 will self contain the metadata for a given application database. Similarly, a propertyID object 352 will self contain the metadata for a given property. By identifying the property using a propertyID object 352 rather than merely an integer value, greater flexibility may be afforded to application developers who wishing to write code to manipulate data records, for different applications. In particular, the propertyID object 352 provides a common reference to different layers of an application, which may refer to the corresponding property using different layer-specific identifiers. Furthermore, this also permits application developers to implement diagnostic mechanisms (e.g. debug print procedures) specific to a property generically, in that it is not necessary to know which application the property is associated with, or the name or data type of the property when a program is written.

To illustrate an exemplary embodiment, consider the following example. An application has a corresponding XML file 312 to contain its metadata information. In accordance with exemplary embodiments described herein, this metadata information is used to generate the classID object 350 and propertyID object instances 352, which represent the same metadata information at runtime. In this example, an application to manage Tasks for which an application database containing data for Task records is maintained has a corresponding XML file (task.xml) as shown in Appendix A. The associated document type definition (metadata.dtd) is shown in Appendix B.

Referring again to FIG. 4A, in exemplary embodiments, in operation, the runtime metadata generator 310 uses the metadata inside the metadata file 312 to generate initialization code 320 to initialize a classID object 350 and to generate initialization code 322 to initialize propertyID objects 352. In one embodiment, the generated initialization code 320, 322 is in the C++ language.

An example of a classID class definition 314 can be found in Appendix C (ClassId.h), and an example of a propertyID class definition 316 can be found in Appendix D (PropId.h) in respect of one example implementation. An example of generated initialization code 320 for the classID object 350 can be found in Appendix E (TaskClassIDImpl.h), and an example of generated initialization code 322 for propertyID objects 352 can be found in Appendix F (TaskPropIDImpl.h) in respect of the example implementation, and with regard to the metadata file 312 (task.xml) of Appendix A.

Referring again to FIG. 4A, a pre-defined (i.e. not generated by the runtime metadata generator 310, but having been previously defined such that it may be used by the runtime metadata generator 310) generic interface 330 (also referred to herein as "IRecord" by way of example) is provided that represents a data record of the application database. It is a common data structure that can be produced and/or consumed by different layers of an application. References (e.g. pointers) to a classID object 350 and propertyID objects 352 are used to identify a specific application database and properties associated with a given data record of the application database inside IRecord (i.e. the classID corresponding to one record can be queried from the record, the propertyIDs of the properties of one record can be queried from the record, and the value of a property can be queried from the record given its propertyID, as will be described in further detail below).

In one example implementation, the following generic methods are provided by the generic interface 330 (in this example, a reference to a specific propertyID ("PropID") is provided as input):

TABLE 1

IRecord Operations

| Operation | Method | Remarks |
| --- | --- | --- |
| Setting primitive property | Set<type> (in PropId, in <type>) | <type> can be replaced by e.g. Int, String, etc. |
| Setting list property | Set<type> (in PropId, in <type>) | <type> can be replaced by e.g. StringArray, FileTimeArray, etc. |
| Getting primitive | Get<type> (in PropId, out <type>**) | <type> can be replaced by |

TABLE 1-continued

IRecord Operations

| Operation | Method | Remarks |
| --- | --- | --- |
| property Getting list property | Get<type> (in PropId, out <type>**) | e.g. Int, String, etc. <type> can be replaced by e.g. StringArray, FileTimeArray, etc. |
| Getting a property based on type | GetProperty (in PropId, out void**) | It simply returns a pointer to the value. The user of this method need to cast it to the corresponding type in order to use it |
| Access the record ID | RECORDID GetRecordId( ) SetRecordID(int RECID) | The RECID is a unique identifier for a record. |

A more detailed example of the generic interface 330 can be found in Appendix G (IRecord.h) in respect of one example implementation.

The generic interface 330 can be used for coding generic code, while for application-specific code, coding against a specific implementation of the generic interface may be preferable.

Accordingly, in operation, the runtime metadata generator 310 generates code for a concrete class 332 that implements the pre-defined, generic IRecord interface 330 and adds additional applications-specific methods based on information in the metadata file 312.

Referring to FIG. 4B, the concrete class 332, in turn, can be instantiated at runtime to create concrete application-specific data records 354. This is typically done through the use of a record factory (e.g. RecordFactory class 334), as described below.

In addition to the data and methods already defined in the IRecord interface 330, the concrete class 332 provides additional get and set methods for each property associated with the database for a specific application. Definitions of the application-specific get and set operations are automatically generated by the runtime metadata generator 310 based on the metadata file 312.

In one example implementation, where the specific application is used to manage Task data records, an instance 354 of a concrete class 332 represents a task record ("TaskRecord"), and may contain the following properties, for example: Title, Start Date, Due Date. In this case, the following methods corresponding to these properties and used to operate on a TaskRecord object may be made available by the runtime metadata generator 310:

TABLE 2

TaskRecord Operations

| Operation | Method |
| --- | --- |
| Set | SetTitle(in WCHAR) SetStartDate(in FileTime) SetEndDate(in FileTime) |
| Get | GetTitle(out WCHAR) GetStartDate(out FileTime) GetEndDate(out FileTime) |

A more detailed example of code for a concrete class 332 can be found in Appendix H (TaskRecordImpl.h) in respect of one example implementation.

Since the generic record interface 330 is defined at an abstract level, an application will not be able to instantiate an object of this class, but can instantiate only a concrete class 332 (e.g. TaskRecord). However, in certain situations, it may be desirable to provide a RecordFactory class 334 that uses the generic record interface 330 and provides a method to create objects of a certain type, such that applications need not be given access to the concrete class 332:

TABLE 3

RecordFactory operations

| Operation | Method | Remarks |
| --- | --- | --- |
| Object Creation | CreateRecord(in ClassId, out IRecord) | Given the type of the record (e.g., Task) it will create the object of the corresponding concrete class. |

More specifically, RecordFactory class 334 may be used to create the data records 354, which are instances of concrete classes 332. A caller of the CreateRecord method of RecordFactory does not need to know which concrete class 332 is being instantiated, as long as the type of the data record is specified. In accordance with exemplary embodiments described herein, a reference to a classID object 350 as input to the method, and the type of the data record can be determined from the classID object 350.

In operation, all source code files including the concrete classes 332 and the initialization code (320, 322) for the classID and propertyID objects are compiled, and the compiled initialization code is executed to establish the runtime metadata environment. Applications of different layers may then use the generated runtime metadata, embodied in the generated classID and propertyID objects (350, 352), to perform various functions.

It will be understood that program source code is typically organized in different application layers, such that the code inside the same application layer is cohesive. The code in different application layers is typically decoupled as much as possible. When reference is made to a layer of an application using runtime metadata embodied in the generated classID and propertyID objects (350, 352), this generally means that the source code inside the application layer calls the methods defined by those objects.

For example:

Transport Access Layer 340: This application layer is responsible for receiving data from and sending data to the wireless network (e.g. 200) through its underlying transport functions. This application layer is a user of the runtime metadata generated by the runtime metadata generator 310. It relies on the classID and propertyID objects (350, 352) to provide the mapping between identifiers associated with an application database and data record properties as used by a server and those used by other parts of an application on the mobile device. It relies on this runtime metadata to perform data conversions between, for example, a server data type and an internal Windows Mobile™ data type, without having to write new code for every type of data record. It relies on this runtime metadata when creating a concrete data record 354 that can be used in other application layers, without having to write new code for every type of data record.

Database Layer 342: This application layer encapsulates the underlying application database from the rest of the system. This application layer is responsible for initializing the underlying database system, providing the database access functions that use the IRecord interface 330. This application layer is a user of the runtime metadata generated by the runtime metadata generator 310. It relies on the runtime metadata to provide the mapping between identifiers associated with data record properties of the used by the various layers of an application on the mobile device. It relies on the runtime metadata to generate a database schema before the application runs. When an application first runs, a database schema is generated from the runtime metadata, saved in the database system, and subsequently used to manage the data saved in the application database by the database system. Before a database system can be used to query, create, update, or delete data, for example, it has to be initialized and told what kind of data it is to handle (e.g. which properties a data record may have, their data types, etc.). These tasks are facilitated using the generated database schema.

Application Layer 344: This layer contains the application-specific procedures. This layer is a user of the runtime metadata generated by the runtime metadata generator 310. It uses the concrete class definition 332 against the concrete data records 354 created by the Transport Access Layer 340 or Database Layer 342, to make application-specific code more explicit. It relies on the runtime metadata to provide the mapping between identifiers associated with an application database and data record properties as used by the various layers of an application on the mobile device.

Graphical User Interface Layer 346: This layer is a user of the runtime metadata generated by the runtime metadata generator 310. It relies on the runtime metadata to provide the mapping between identifiers associated with an application database and data record properties as used by a user interface framework and those used by other layers of an application on the mobile device. It relies on the runtime metadata to provide generic data display and manipulation functions.

Examples of code segments to perform identifier mapping, data conversion, and data schema generation functions can be found in Appendix "I" in respect of one example implementation. Generally, code to perform such functions may be incorporated by application developers into application programs that use the generated runtime metadata.

Figure 5:
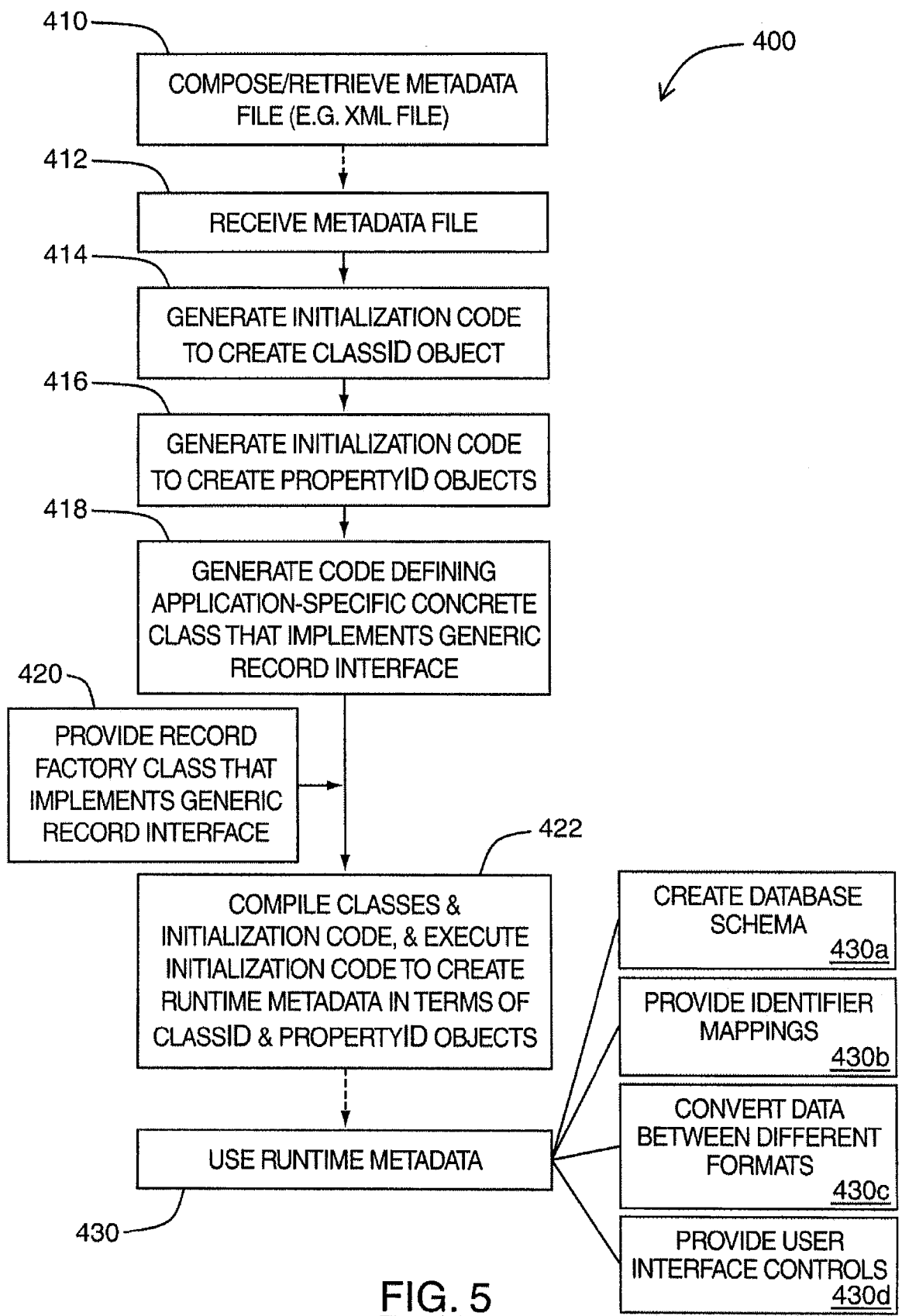
FIG. 5 is a flowchart illustrating steps of a method of generating runtime metadata for use in the development of mobile device applications in a number of example embodiments.

Further details on the generation of runtime metadata by the runtime metadata generator 310 will now be provided with reference to FIG. 5.

Referring now to FIG. 5, a flowchart illustrating steps in a method of generating runtime metadata for use in the development of mobile device applications is shown generally as 400. Additional details of method 400 are provided in this specification with respect to the description associated with FIGS. 4A and 4B.

As described with reference to FIGS. 4A and 4B, the runtime metadata generator 310 initially takes as input a file 312 that has been used to capture the metadata for a database associated with an application (e.g. database of tasks, database of contacts, database of memos) prior to generating runtime metadata in terms of a classID object 350 and propertyID objects 352. In one embodiment, the metadata for a database associated with an application is provided as an XML file 312.

Accordingly, prior to the performance of subsequent steps of method 400 where the runtime metadata is generated by the runtime metadata generator 310 (see e.g. steps 412 to 422), the metadata file 312 is composed or otherwise retrieved, for input to the runtime metadata generator 310 at step 410.

At step 412, the metadata file 312 that was composed or otherwise retrieved at step 410 is received as input by the runtime metadata generator 310 at step 412. At this step, the metadata file 312 is parsed by the runtime metadata generator 310 to retrieve information pertaining to the database and the properties of the data records thereof.

At step 414, the runtime metadata generator 310 generates initialization code 320 which, when compiled (e.g. in a Microsoft Integrated Development Environment on a personal computer) and executed at a mobile device (e.g. mobile device 100 of FIG. 1), will result in the creation of an instance of a classID object 350.

The initialization code 320 that will create the classID object 350 is generated by the runtime metadata generator 310 using the pre-defined ClassID class definition 314, as well as the information from the metadata file 312 received at step 412 specifically associated with the database for a particular application. Information from the metadata file 312 (e.g. the application database name, application database identifiers as used in different application layers, the number of properties associated with data records of the database, where the properties are defined) is extracted by the runtime metadata generator 310 to generate the initialization code 320 that will create the classID object 350. As a further example, metadata in file 312 may be used to indicate the database volume (e.g. file on disk) that the application database should be placed in, by the initialization code. Accordingly, the classID object 350 that is created at runtime will be specifically associated with that application database.

Multiple classID objects 350 may be created at runtime, through the performance of multiple iterations of method 400. For example, each classID object 350 that is created from initialization code 320 generated at step 414 in a given iteration of method 400 might correspond with one database associated with an application selected from the following group: Tasks, Contacts, Memos. It will be understood by persons skilled in the art that this list is provided by way of example only.

In one embodiment, in operation, a classID object 350 will be created as a static object. A classID object 350 provides public static member functions that, for example, facilitate retrieval of a reference (e.g. pointer) to a particular instance of a classID object, given its metadata (e.g. database name, a database identifier as used in a given application layer) in different representations. There will also exist functions that allow the metadata associated with a classID object 350 to be queried given its reference (e.g. given a reference to a particular instance of a classID object 350, its corresponding name in a string format may be returned).

Similarly, at step 416, the runtime metadata generator 310 generates initialization code 322 which, when compiled and executed at the mobile device, will result in the creation of one or more instances of a propertyID object 352.

The initialization code 322 that will create propertyID objects 352 is generated by the runtime metadata generator 310 using the pre-defined PropertyID class definition 316, as well as the information from the metadata file 312 received at step 412 specifically associated with the database associated with a particular application. Information from the metadata file 312 (e.g. a property name, property identifiers as used in different application layers, the data type of a property) are extracted by the runtime metadata generator 310 to generate the initialization code 322 that will create the propertyID object 352. Accordingly, each propertyID object 352 that is created at runtime will be specifically associated with the particular application database.

For a database associated with a given application (e.g. Tasks, Contacts, Memos), multiple propertyID objects 352 will typically be created at runtime after the initialization code 322 is compiled and executed. For example, where the application database is used to store Task records, a propertyID object 352 for each of the following properties might be created: title, start date, due date. It will be understood by persons skilled in the art that this list is provided by way of example only.

In one embodiment, in operation, each propertyID object 352 will be created as a static object. Each propertyID object 352 provides public static member functions that, for example, facilitate the retrieval of a reference (e.g. pointer) to the respective propertyID object 352, given its metadata in different representations.

For example, there will exist a function that, given the string name of a specific property, will return a reference (e.g. a pointer) to the static instance of the corresponding propertyID object 352. There will also exist functions that allow the metadata associated with a propertyID object 352 to be queried given its reference (e.g. given a reference to a particular static instance of a propertyID object 352, its corresponding name in a string format may be returned).

At step 418, the runtime metadata generator 310 generates code for a concrete class 332 that implements the pre-defined, generic IRecord interface 330. In addition to the data and methods provided by the IRecord interface 330, the concrete class 332 provides additional get and set methods for each property associated with the database for a specific application. Definitions of the application-specific get and set operations are automatically generated by the runtime metadata generator 310 based on information in the metadata file 312 (e.g. property names, property types, etc.) received at step 412.

In operation, an application will instantiate the concrete class, for which code was generated at step 418, to create individual concrete data records 354 for the application. For example, a TaskRecord concrete class may be instantiated when creating a new Task record. The corresponding classID and propertyIDs are embedded in the data record that is created.

In certain implementations, it may not be desirable for applications to have direct access to the definition of a concrete class 332. Accordingly, a separate class (e.g. RecordFactory 334) may be provided at step 420, which provides a public method used to create a data record 354 given a reference to a classID object 350 (this defines the type of record to be created). Generally, a program can invoke a method of RecordFactory 334 to create a concrete data record 354, or the classID object 350 associated with the concrete data record 354. The pre-defined RecordFactory class 334 is generic, and its methods can be used to create different types of concrete data records.

At step 422, all of the source code necessary to initialize the runtime metadata environment (see. FIG. 4B) for the particular application, including classes and initialization code generated by the runtime metadata generator 310 at the steps of method 400 (e.g. at steps 414 to 418) are compiled (e.g. at a personal computer), and the object code is subsequently downloaded to a mobile device (e.g. mobile device 100) after compilation, for execution.

When the application starts running on the mobile device, the compiled initialization code is executed, resulting in the creation of runtime metadata for the database associated with the application in the form of a classID object 350 and propertyID objects 352. This runtime metadata may then be used by applications to access and manipulate data of data records in the application database, as shown at step 430.

The classID object 350 and propertyID objects 352 for a given database associated with an application are closely related. In use, given a reference to an instance of a classID object 350, a list of references to associated propertyID objects 352 can be obtained. Similarly, given a reference to an instance of a propertyID object 352, a reference to the associated classID object 350 can be obtained.

In general, references to classID and propertyID objects (350, 352) can be used to identify different application databases and properties of data records thereof respectively. Accordingly, for any given database record (354), applications will have access to the metadata for the record through its associated classID and propertyID objects (350, 352), since the classID and propertyID are embedded in the data record object. This makes it simpler and easier for application developers to write general code to handle different data records for different applications.

Figure 6:
FIG. 6 is an example of a database table and its data schema that can be generated from runtime metadata.

For example, all pertinent information in respect of an application database is initially encoded in the metadata file 312, and subsequently reflected in the generated runtime metadata in the form of classID and propertyID objects (350, 352). Accordingly, in use, this runtime metadata can be employed to create a database schema for use by the database layer 342 of an application before the application runs, as shown at 430a. An example of a database table and its data schema that can be generated from runtime metadata is shown generally as 500 in FIG. 6.

As a further example, depending on the application module that wishes to access or manipulate the data records of a particular application database, the application database may be known to or referenced by different modules using different names or identifiers. Similarly, any given property of the application database may be identified using different names or identifiers in different contexts.

Figure 7:
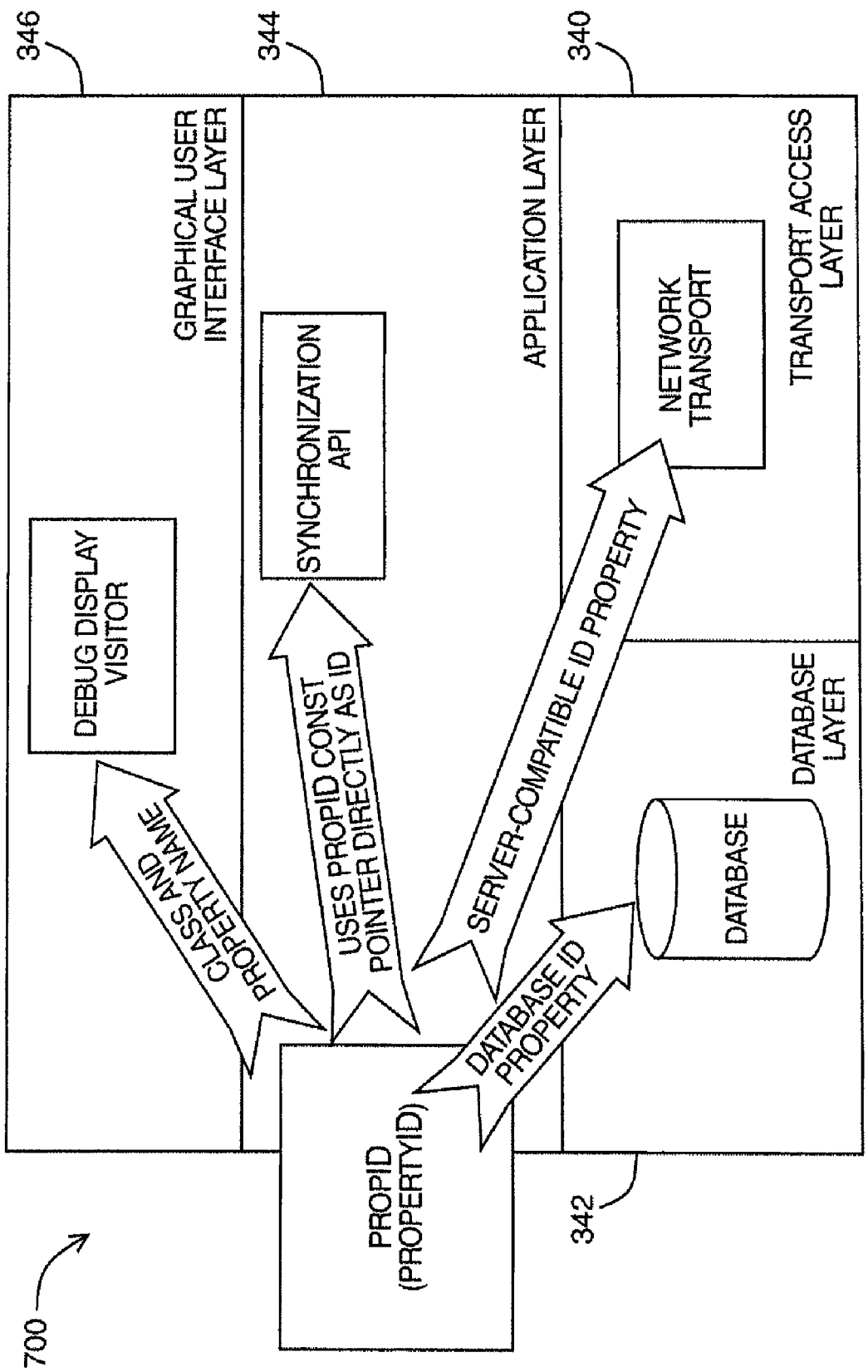
FIG. 7 is a schematic diagram illustrating how different identifiers may be associated with the same property of an application database.

For instance, a module associated with a transport access layer 340 of an application may refer to a certain property of an application database using a different identifier than would a module associated with the application layer 344 of an application, or the graphical user interface layer 346 of an application. The schematic diagram shown generally as 600 in FIG. 7 illustrates how different identifiers may be associated with the same property of an application database.

Accordingly, in one embodiment, the runtime metadata generated by the runtime metadata generator 310 facilitates a mapping between different identifiers as used in different application layers (340, 342, 344, 346) that represent the same application database property. In this regard, propertyID objects 352 provide access to methods that perform the mapping between a property identifier as used in a particular application layer, and a reference (e.g. pointer) to the propertyID object 352 that is used internally to represent the corresponding property across different application layers. Similarly, a classID object 350 provides access to methods that perform the mapping between a database identifier as used in a particular application layer and a reference (e.g. pointer) to the classID object 350 that is used internally to represent the corresponding application database across different application layers. These mapping methods may be called as required by the various application layers, as shown at 430b.

Certain properties of a database may be associated with different types in different contexts. For example, data associated with a particular property may be represented as one type by the transport access layer 340 for use by a server, while the data may be represented as a different type by the mobile device 100. Type information associated with properties are embedded in the runtime metadata generated by the runtime metadata generator 310.

Accordingly, in one embodiment, the runtime metadata generated by the runtime metadata generator 310 also facilitates the conversion between data of different property types as shown at 430c, by allowing a generic function to be written that converts data by data types, rather than by property name and class name, made possible with the provision of the runtime metadata (e.g. as classID and propertyID objects). As a result, it is unnecessary for application developers to write separate code to perform the conversion for different types of data records for different applications. As noted, the conversion methods may be called using the reference to a propertyID object 352, and the conversion may be performed without requiring knowledge of the database name and corresponding property name.

In one embodiment, the runtime metadata (e.g. as classID and propertyID objects) generated by the runtime metadata generator 310 may be used in the programming of generic user interface controls for manipulating data records and displaying data to users of a mobile device, as shown at 430d.

It will be understood by persons skilled in the art that the uses of runtime metadata as shown at 430a to 430d of step 430 are provided by way of example only, and other uses of the runtime metadata may be provided in variant embodiments.

The Appendices appended hereto form part of the present specification, and are provided for general illustration purposes only. They are provided herein as a guide, to aid the skilled reader in better understanding of embodiments of the systems and methods as described above. In particular, it will be understood by persons skilled in the art that in some cases, the code in an Appendix may be provided in a pseudo-code like format, requiring minor modifications and/or additional coding within the ordinary skill of such persons, before it is suitable for use in an actual implementation.

The steps of a method of generating runtime metadata for use in the development of mobile device applications in embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of generating runtime metadata for use in the development of a mobile device application, the method comprising:

parsing a metadata file associated with an application database;

generating initialization code for instantiating a first class from the metadata file such that when the initialization code for instantiating the first class is executed, a first object is created for storing metadata for the application database that is accessible by one or more application layers at runtime;

generating initialization code for instantiating a second class from the metadata file such that when the initialization code for instantiating the second class is executed, one or more second objects are created, each for storing metadata for a property of a data record of the application database that is accessible by the one or more application layers at runtime; and converting data between different data formats using the metadata stored in at least one of the first object and the one or more second objects.

2. The method of claim 1, wherein the first object comprises an internal identifier that identifies the application database, and at least one identifier each used by a different application layer that identifies the application database; and wherein each second object comprises an internal identifier that identifies the application database, and at least one identifier each used by a different application layer that identifies the respective property.

3. The method of claim 2, wherein the first object contains references to each of the one or more second objects, and wherein each of the one or more second objects contains a reference to the first object.

4. The method of claim 1, wherein the first class and the second class are defined prior to the performance of the method.

5. The method of claim 1, further comprising generating a concrete class that implements a generic interface representing a data record, wherein an instance of the concrete class represents a data record associated with the mobile device application, wherein the generic interface is defined prior to the performance of the method.

6. The method of claim 1, further comprising using the metadata stored in at least one of the first object and the one or more second objects to create a database schema.

7. The method of claim 1, further comprising using the metadata stored in at least one of the first object and the one or more second objects to provide a mapping between different property identifiers.

8. The method of claim 1, further comprising using the metadata stored in at least one of the first object and the one or more second objects to provide a user interface control for at least one of displaying and manipulating data of a data record of the database.

9. The method of claim 1, wherein the first object contains references to each of the one or more second objects, and wherein each of the one or more second objects contains a reference to the first object.

10. A physical computer-readable medium on which a plurality of executable instructions is stored, the instructions for performing a method of generating runtime metadata for use in the development of a mobile device application comprising:

parsing a metadata file associated with an application database;

generating initialization code for instantiating a first class from the metadata file such that when the initialization code for instantiating the first class is executed, a first object is created for storing metadata for the application database that is accessible by one or more application layers at runtime;

generating initialization code for instantiating a second class from the metadata file such that when the initialization code for instantiating the second class is executed, one or more second objects are created, each for storing metadata for a property of a data record of the application database that is accessible by the one or more application layers at runtime; and converting data between different data formats using the metadata stored in at least one of the first object and the one or more second objects.

11. A system for generating runtime metadata for use in the development of a mobile device application, the system comprising a processor configured to:

parse a metadata file associated with an application database;

generate initialization code for instantiating a first class from the metadata file such that when the initialization code for instantiating the first class is executed, a first object is created for storing metadata for the application database that is accessible by one or more application layers at runtime;

generate initialization code for instantiating a second class from the metadata file such that when the initialization code for instantiating the second class is executed, one or more second objects are created, each for storing metadata for a property of a data record of the application database that is accessible by the one or more application layers at runtime; and convert data between different data formats using the metadata stored in at least one of the first object and the one or more second objects.

12. The system of claim 11, wherein the first object comprises an internal identifier that identifies the application database, and at least one identifier each used by a different application layer that identifies the application database; and wherein each second object comprises an internal identifier that identifies the application database, and at least one identifier each used by a different application layer that identifies the respective property.

13. The system of claim 11, wherein the first object contains references to each of the one or more second objects, and wherein each of the one or more second objects contains a reference to the first object.

14. The system of claim 12, wherein the first object contains references to each of the one or more second objects, and wherein each of the one or more second objects contains a reference to the first object.

15. The system of claim 11, wherein the processor is further configured to create a database schema using the metadata stored in at least one of the first object and the one or more second objects.

16. The system of claim 11, wherein the processor is further configured to provide a mapping between different property identifiers using the metadata stored in at least one of the first object and the one or more second objects.

17. The system of claim 11, wherein the processor is further configured to provide a user interface control for at least one of displaying and manipulating data of a data record of the database, using the metadata stored in at least one of the first object and the one or more second objects.

* * * * *